United States Patent
Gromes, Sr. et al.

(10) Patent No.: US 10,265,834 B2
(45) Date of Patent: Apr. 23, 2019

(54) SYSTEM FOR REMOTELY CONTROLLING AN OPERATING DEVICE

(71) Applicant: TERYDON, INC., Navarre, OH (US)

(72) Inventors: Terry D. Gromes, Sr., Navarre, OH (US); Terry D. Gromes, Jr., Navarre, OH (US); Jon M. Shockey, Jr., Canton, OH (US); William C. Jackson, Canton, OH (US)

(73) Assignee: Terydon, Inc., Navarre, OH (US)

( * ) Notice: Subject to any disclaimer, the term of this patent is extended or adjusted under 35 U.S.C. 154(b) by 755 days.

(21) Appl. No.: 14/204,265

(22) Filed: Mar. 11, 2014

(65) Prior Publication Data

US 2014/0336827 A1 Nov. 13, 2014

Related U.S. Application Data

(60) Provisional application No. 61/821,433, filed on May 9, 2013.

(51) Int. Cl.
*G05D 7/06* (2006.01)
*B24C 7/00* (2006.01)
(Continued)

(52) U.S. Cl.
CPC .............. *B24C 7/0015* (2013.01); *B26D 7/22* (2013.01); *B26F 3/004* (2013.01); *G05B 9/02* (2013.01);
(Continued)

(58) Field of Classification Search
CPC ...... B24C 7/0015; G05B 19/406; G05B 9/02; G05B 2219/45036; G05B 2219/39447;
(Continued)

(56) References Cited

U.S. PATENT DOCUMENTS 4,379,335 A * 4/1983 Kirsch ...................... B25J 9/20
318/568.13
4,380,796 A * 4/1983 Ostby ................. G05B 19/409
340/4.36

(Continued)

FOREIGN PATENT DOCUMENTS

| CN | 201828811 U | 5/2011 |
|---|---|---|
| DE | 3426889 | 5/1985 |
| WO | 2009/131512 | 10/2009 |

OTHER PUBLICATIONS

Topcon introduces X-22 wireless excavator control system. Article [online]. Equipment World Staff, 2011 [retrieved on Aug. 29, 2016]. Retrieved from the internet: <URL: http://www.equipmentworld.com/topcon-introduces-x-22-wireless-excavator-control-system/>, Annotated.*

(Continued)

*Primary Examiner* — Robert E Fennema
*Assistant Examiner* — Marzia T Monty
(74) *Attorney, Agent, or Firm* — Sand, Sebolt & Wernow Co., LPA

(57) ABSTRACT

The present invention provides a system and method for wirelessly controlling an operating device by way of a wireless connection between the operating device and a computing device. The computing device provides an interface for controlling the operating device via a control unit which is removably connected to the operating device. The control unit and the computing device communicate wirelessly allowing a user to move about freely while still controlling operating device. Control unit may include at least one valve for use in controlling the operating device.

26 Claims, 4 Drawing Sheets

(51) Int. Cl.
  *G06F 3/01* (2006.01)
  *G05B 9/02* (2006.01)
  *B26F 3/00* (2006.01)
  *B26D 7/22* (2006.01)
  *G05B 19/406* (2006.01)
  *G06F 3/0488* (2013.01)
  *B26D 5/00* (2006.01)

(52) U.S. Cl.
  CPC ......... *G05B 19/406* (2013.01); *G05D 7/0617* (2013.01); *G05D 7/0676* (2013.01); *G06F 3/01* (2013.01); *G06F 3/04886* (2013.01); *B26D 5/00* (2013.01); *G05B 2219/39447* (2013.01); *G05B 2219/45036* (2013.01)

(58) Field of Classification Search
  CPC ......... G06F 3/04886; G06F 3/01; B26D 7/22; B26D 5/00; G05D 7/0676; G05D 7/0617; B26F 3/004
  See application file for complete search history.

(56) References Cited

U.S. PATENT DOCUMENTS

| | | | | |
|---|---|---|---|---|
| 4,760,859 | A * | 8/1988 | Brown | G01L 19/14 137/454.2 |
| 5,954,494 | A | 9/1999 | Goldsmith et al. | |
| 6,681,839 | B1 | 1/2004 | Balzer | |
| 6,877,930 | B2 | 4/2005 | Stromdahl et al. | |
| 7,228,125 | B2 * | 6/2007 | Adachi | E02F 9/26 345/169 |
| 8,057,607 | B2 | 11/2011 | Gardner et al. | |
| 8,078,297 | B2 * | 12/2011 | Lasher | G05B 19/0426 172/779 |
| 8,195,344 | B2 * | 6/2012 | Song | G08C 17/00 701/2 |
| 8,612,641 | B1 | 12/2013 | Bozarth et al. | |
| 8,676,390 | B2 * | 3/2014 | Berry, Jr. | G05B 19/4188 700/20 |
| 8,978,276 | B2 * | 3/2015 | Moon, Jr. | G08C 17/02 340/12.5 |
| 9,363,220 | B2 | 6/2016 | Ubillos et al. | |
| 2003/0065424 | A1 * | 4/2003 | Erichsen | B24C 1/045 700/281 |
| 2003/0147727 | A1 * | 8/2003 | Fujishima | E02F 3/435 414/200 |
| 2003/0202091 | A1 | 10/2003 | Garcia et al. | |
| 2004/0093850 | A1 | 5/2004 | Horii et al. | |
| 2004/0182842 | A1 | 9/2004 | Denney et al. | |
| 2005/0196314 | A1 | 9/2005 | Petersen et al. | |
| 2006/0090622 | A1 | 5/2006 | Adkins | |
| 2006/0212203 | A1 * | 9/2006 | Furuno | E02F 9/205 701/50 |
| 2008/0062140 | A1 | 3/2008 | Hotelling et al. | |
| 2008/0175569 | A1 | 7/2008 | Johnson | |
| 2008/0204426 | A1 | 8/2008 | Hotelling et al. | |
| 2008/0282583 | A1 * | 11/2008 | Koellner | E02F 3/304 37/348 |
| 2009/0097502 | A1 * | 4/2009 | Yamamoto | G05B 19/4185 370/466 |
| 2010/0095559 | A1 | 4/2010 | Buckner | |
| 2010/0185364 | A1 | 7/2010 | McClure | |
| 2010/0186971 | A1 * | 7/2010 | Seyffert | A62C 31/22 169/13 |
| 2010/0313451 | A1 * | 12/2010 | Trubiano | E01H 5/104 37/228 |
| 2011/0186657 | A1 * | 8/2011 | Haviland | A62C 27/00 239/722 |
| 2011/0287692 | A1 | 11/2011 | Erichsen et al. | |
| 2011/0301755 | A1 * | 12/2011 | Anderson | A01G 25/09 700/246 |
| 2011/0315164 | A1 * | 12/2011 | DesOrmeaux | B08B 9/0933 134/21 |
| 2012/0007885 | A1 * | 1/2012 | Huston | H04L 67/18 345/633 |
| 2012/0061108 | A1 * | 3/2012 | Cerrano | A62C 37/00 169/46 |
| 2012/0229662 | A1 * | 9/2012 | Lankalapalli | G05B 19/409 348/211.8 |
| 2012/0330449 | A1 * | 12/2012 | Edwards | B26D 5/00 700/97 |
| 2013/0030589 | A1 | 1/2013 | Pessina et al. | |
| 2013/0033090 | A1 | 2/2013 | Jokonya | |
| 2013/0167697 | A1 | 7/2013 | Reukers | |
| 2013/0271004 | A1 | 10/2013 | Min et al. | |
| 2014/0045409 | A1 | 2/2014 | Zhang et al. | |
| 2014/0046477 | A1 | 2/2014 | Brahan et al. | |
| 2015/0065114 | A1 | 3/2015 | Dua | |
| 2015/0379785 | A1 | 12/2015 | Brown, Jr. et al. | |

OTHER PUBLICATIONS

WardJet Brochure, X-Classic Controller, 2012, 3 pages.

\* cited by examiner

SYSTEM FOR REMOTELY CONTROLLING AN OPERATING DEVICE

CROSS-REFERENCE TO RELATED APPLICATION

This application claims priority from U.S. Provisional Application Ser. No. 61/821,433, filed May 9, 2013, the disclosure of which is incorporated herein by reference.

BACKGROUND OF THE INVENTION

Technical Field

The present invention relates to control of devices. More particularly, the present invention relates to providing wireless control capabilities to an operating device, such as a water jet cutting machine. Specifically, the present invention relates to connecting a control unit to an operating device and wirelessly actuating the control unit to operate the operating device.

Background Information

Often operating devices commonly used in industry are both manually controlled by a user as well as dangerous to the user. A water jet cutting machine is an example of such an operating device. Water jet cutting is an extremely dangerous activity, as the pressurized stream of water can cut through materials as hard as metal. It follows that any part of a human would easily be cut by this stream of water. Therefore, a user must always keep proper control of the cutting machine and ensure that the user's extremities are out of harm's way. However, water jet cutting machines are controlled via hydraulic or pneumatic tubes running from a control station which the user actuates to control the water jet cutting machine. This control station is typically a desk-like structure with four extending legs and is generally not practically movable. Therefore, the user is in a fixed position which may force the user to take unnecessary risks to remain in the fixed position while the water jet cutting machine passes close thereby. Further, the immovable nature of the control station may severely limit the user's ability to view the actual operations of the cutting machine. Still further, current water jet cutting machines do not account for whether the user is actually in control of the machine. The machine simply keeps cutting and performing its operations whether or not the user is positioned at the controls.

Thus, there is a tremendous need in the art to provide a mechanism for the user or controller of an operating device such as a water jet cutting machine to remain in control of the machine while still remaining mobile and not fixed to a particular position. Further, there is an additional tremendous need in the art to provide a system or method for ensuring the user is in control of the operating device, and has not become incapacitated, disabled, or simply left the machine's controls. There is a need in the art for an easy to assemble solution, possibly by way of a downloadable application installed on a computing device and connected logically to portions of the computing device's hardware.

SUMMARY

In one aspect, the invention may provide a method comprising the steps of: connecting a computing device to a control unit wirelessly; connecting a control unit to an operating device via a connector; providing a plurality of control valves in the control unit, wherein the connector connects the plurality of control valves to the operating device; and using the computing device to operate the operating device via the connector and the plurality of control valves of the control unit.

In another aspect, the invention may provide a system adapted to activate and deactivate an operation of an operating device, the system comprising: a control unit having a first wireless module, wherein the control unit is removably connected to the operating device; a valve control body disposed in the control unit, wherein the valve control body is operable in an open position and a closed position; a connector having a first end and a second end, wherein the first end is connected to the valve control body, and wherein the second end is removably connected to the operating device; a computing device having a second wireless module; a wireless communication link between the first wireless module and the second wireless module; wherein the computing device is operable to move the valve body between the open position and closed position via the wireless communications link; wherein the operation is activated when the valve control body is in one of the open position and the closed position; and wherein the operation is deactivated when the valve control body is in the other one of the open position and the closed position.

In another aspect, the invention may provide a method comprising: connecting a computing device to a control unit wirelessly to form a wireless communication link therebetween; connecting the control unit to an operating device by way of a connector; enabling a control signal between the control unit and the operating device via the connector, wherein the control signal activates an operation of the operating device; disabling the control signal between the control unit and the operating device via the connector to deactivate the operation of the operating device wherein the enabling step is actuated by the computing device; and wherein the disabling step is actuated by the computing device.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

DETAILED DESCRIPTION

Figure 1:
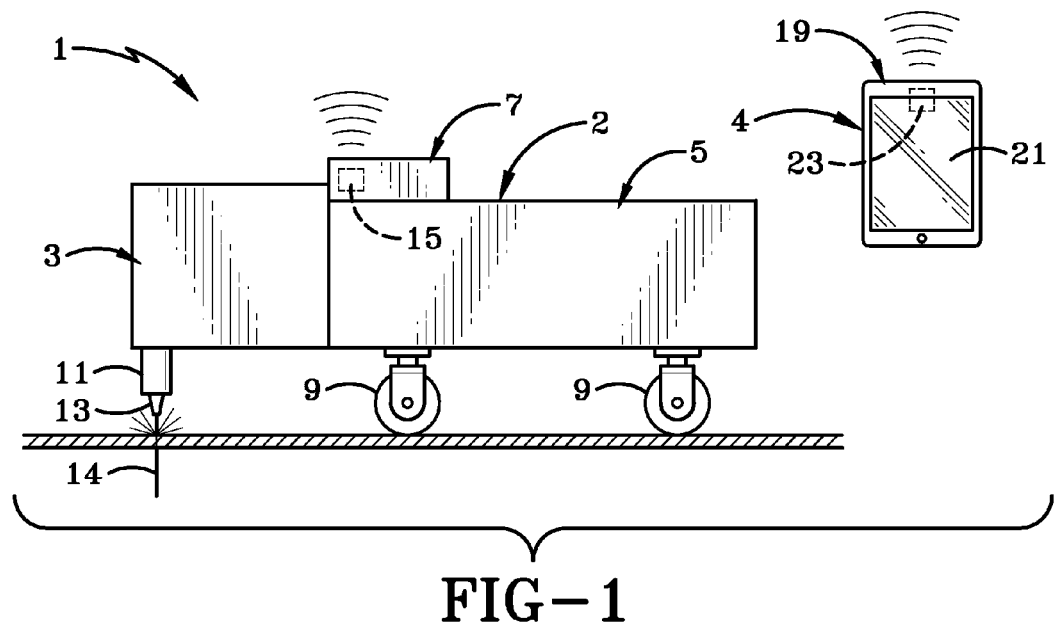
FIG. 1 is a view of a first embodiment of the present invention, including an operating device in the form of a water jet cutting machine and a computing device in the form of a remote control.

As shown in FIG. 1, the present invention pertains to a system and method for wireless control, a first embodiment thereof hereinafter referred to as system 1. System 1 is adapted to provide control of an operating device having at least one operation, which may be embodied in a device such as a water jet cutting machine, hereinafter referred to as water jet cutting machine 2. System 1 provides control by way of a computing device, hereinafter referred to as a remote control 4.

Water jet cutting machine 2 may be of any type of water jet device. For the present example, water jet cutting machine 2 is generally divided into a working unit 3 and a pump unit 5 interconnected by various components necessary and commonly used in the field of water jet technology, for example, a line for high pressure water, electrical power, and related mechanical elements and circuitry. Water jet cutting machine 2 further includes a control system or control unit 7 for controlling all of the various features of water jet cutting machine 2, including movement of water jet cutting machine 2 itself as well as control of the internal mechanisms relating to the stream of high pressure water. Control unit 7 may be integrated with water jet cutting machine 2 or may be separately connected thereto by way of connectors, as discussed in greater detail below.

Pump unit 5 includes all of the various features and mechanisms for moving water jet cutting machine 2 within the desired environment, including movement such as forward, reverse, left, right, stop, jog, etc. Pump unit 5 further includes all of the various features and mechanisms for pumping high pressure water from a water reservoir (not shown) or hose (not shown) to working unit 3 for use thereby. Pump unit 5 may further include a plurality of wheels 9 for use in moving water jet cutting machine 2 within the desired environment. It will be readily understood that pump unit 5 includes the various mechanical and electrical components necessary for moving water jet cutting machine 2 and supplying pumped high pressure water from pump unit 5 to working unit 3.

Working unit 3 includes various components necessary for applying a high pressure stream of water to the desired environment. As such, working unit 3 may include a nozzle holder 11 connected to a nozzle 13 for use in expelling a pressurized stream of water 14. Nozzle holder 11 and nozzle 13 are necessarily interconnected to the high pressure pumped water received from pump unit 5 as well as various motors or hydraulic mechanisms for moving nozzle 13 in the desired direction to expel high pressure stream of water 14 at a proper angle and flow rate in the desired environment.

Control unit 7 is interconnected with a wireless module 15. This connection may be done by a user manually coupling wireless module 15 to control unit 7 in an aftermarket hardware upgrade, or wireless module 15 may be integrated with control unit 7 by the manufacturer. Wireless module 15 includes all of the various circuitry and components necessary for transmitting and receiving electromagnetic radiation, particularly electromagnetic radiation in the radio frequency spectrum, namely 3 kHz to 300 GHz. Henceforth, this electromagnetic radiation will be referred to as "signals". Wireless signals received by wireless module 15 are used by control unit 7 to actuate the various components of water jet cutting machine 2. As such, wireless signals may actuate any of the various features or operations included in working unit 3 or pump unit 5. These features or operations include moving water jet cutting machine 2 in any direction or starting and stopping movement. The signals may also actuate any of the features or operations associated with nozzle 13 such as starting or stopping the flow of water, narrowing or widening the flow of water, or raising or lowering nozzle 13. The signals may also initiate an emergency stop procedure wherein all of the components of water jet cutting machine 2 immediately stop or shut down, including ceasing pressurized stream of water 14. This emergency stop may dump or cease pressure at working unit 3 or pump unit 5, or may dump or cease pressure at both working unit 3 and pump unit 5 to ensure safety and an immediate halt to the dangerous activity.

Control unit 7 may provide feedback relating to water jet cutting machine 2 to remote control 4 by way of wireless module 15. Control unit 7 may gather and update internal metrics and system information and provide this information to remote control 4 by way of wireless signals transmitted by wireless module 15. Wireless module 15 may transmit information such as current pounds per square inch ("PSI") of pressurized stream of water 14, gallons per minute ("GPM") of pressurized stream of water 14, orifice size of nozzle 13, current battery charge of an onboard battery system (not shown), or any other metrics or information available in water jet cutting machine 2. Control unit 7 may also include a memory (not shown) which stores or logs information relating to the operation of water jet cutting machine 2 for later transmission to remote control 4 or for later retrieval via an electronic wired connection directly to control unit 7 or for sending via email or any other data retrieval means.

Remote control 4 includes a housing 19 formed and sized to be portable and easily carried by an individual user. Remote control 4 further includes an interface 21 and wireless module 23 connected therebetween by circuitry and supported by a processor and all of the various electronic and mechanical devices necessary to support a portable computing device. Interface 21 is preferably embodied in a touchscreen interface. However, interface 21 may be any style of input/output system which may receive and provide graphical or tactile or any other informational responses via an engagement with the user. Wireless module 23 is similar to wireless module 15 in that wireless module 23 receives and transmits signals by way of electromagnetic radiation in the radio frequency spectrum. Wireless module 23 receives input from either the user via interface 21 or from wireless module 15 via signals. In the event that wireless module 23 receives input from the user via interface 21, wireless module 23 translates this input into signals readable by wireless module 15 and transmits these signals wirelessly thereto. Alternatively, in the event that wireless module 23 receives input from wireless module 15 via wireless signals, wireless module 23 translates this input into graphical or tactile representations and provides this input to the user via interface 21. Thus, it is a primary feature of the present invention to couple wireless module 23 with wireless module 15 to enable a user to hold remote control 4 and wirelessly actuate the various components and systems of water jet cutting machine 2, including any actuating any operations of machine 2.

Remote control 4 may be embodied by a common off-the-shelf component such as a tablet, phone, or any other common mobile computing device available to a common consumer. This mobile computing device receives a bundle of software or application which provides interface 21 to the user via the interface of the computing device. As such, the user or business may already own a device which can provide the hardware required for remote control 4 for water jet system 1. This represents and enormous cost savings to the user as a critical underlying piece of hardware for implementing system 1 may already be owned by the user.

Figure 2:
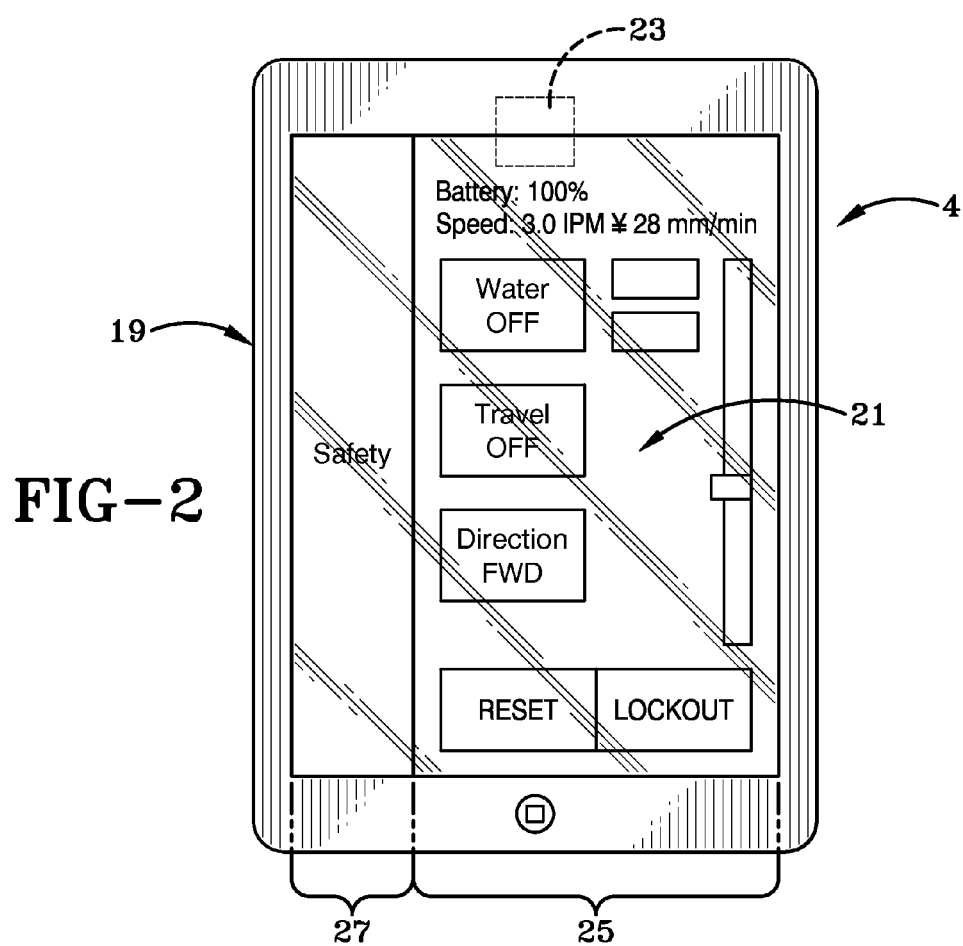
FIG. 2 is an enlarged view of an embodiment of the remote control of the present invention.

As shown in FIG. 2, interface 21 includes at least two zones for use in controlling and actuating the operations of water jet cutting machine 2. A control zone 25 is defined by interface 21 and used to display and input information relating to the control of water jet cutting machine 2. Control zone 25 may display the gathered metrics, feedback, or other information captured by control unit 7 and transmitted to remote control 4 by wireless module 15. Control zone 25 may also display a graphical user interface for controlling the movement of water jet cutting machine 2, the water pressure, nozzle 13 orifice size, or any other feature or operation the user may wish to control.

As shown in FIG. 2, a safety zone 27 is also defined by interface 21 and preferably located proximate control zone 25. Safety zone 27 is preferably touch sensitive and is connected via the circuitry and system logic of interface 21 to control unit 7 by way of wireless module 23 and wireless module 15. Safety zone 27 provides an elongated area along the side of interface 21 for receiving a finger of the user to ensure the user is in control of remote control 4 and manually holding remote control 4 by at least one hand. As such, safety zone 27 acts as a "dead man's switch" and is wired into the circuitry of interface 21 to immediately and automatically stop dangerous operations of water jet cutting machine 2 in the event the user holding remote control 4 manually releases a finger from safety zone 27.

Safety zone 27 and the ability to shut down system 1 in the event the user is no longer in control represents a critical safety feature of the present invention in that any time a user releases the touch connection between the user and safety zone 27, the dangerous operation of water jet cutting machine 2 ceases. A user may release remote control 4 due to incapacitation, disability, simple neglect, or even due to recklessness. In the preferred embodiment of the invention, all operations of water jet cutting machine 2 immediately stop when interface 21 senses a release of a finger from safety zone 27. However, inasmuch as the most critical and dangerous component of water jet cutting machine 2 is pressurized stream of water 14, at the minimum, water jet system 1 preferably ceases the operation of expelling pressured stream of water 14 when safety zone 27 is released by the user.

The present invention may include the feature that the emergency "STOP" instruction generated by the release of the user's finger from safety zone 27 is given top software level and machine level priority in water jet system 1. In the underlying machine language, various interrupts and message priorities may be given to the instruction which informs control unit 7 to cease operations of water jet cutting machine 2. This provides almost instantaneous and real-time control of water jet cutting machine 2 and ensures that the overall deactivation of water jet 2 is given top priority at the software and machine level.

Inasmuch as the user must be pressing at least one finger against safety zone 27, interface 21 continuously polls safety zone 27 for a touch input. When interface 21 receives an affirmative response that the user is touching safety zone 27, interface 21 continues normal operations and receives/transmits signals via wireless module 23 and interface 21 as needed. Control zone 25 receives input from the user and operates water jet cutting machine 2 as discussed above. However, the wireless nature of remote control 4 allows the user to adjust his physical whereabouts to best view and operate water jet cutting machine 2 as long as safety zone 27 is receiving a touch from the user. As such, water jet system 1 provides additional safety benefits in that a user is not "tied" to water jet cutting machine 2 by hoses or wires. The user may move and adjust physical position accordingly to remain safe and to more clearly observe the operations.

While the dead man's switch feature may be implemented by way of safety zone 27 on touchscreen interface 21, the present invention may encompass any way of providing a similar safety feature for stopping an operation when system 1 senses the user is no longer in control. For example, a button (not shown) may be provided which requires the user to push in or hold down the button to indicate the user is in control of system 1. Alternatively, a still camera or video camera (not shown) may be provided to acquire images of the user or holder of a portion of system 1 to indicate the user is in control of system 1. The camera may acquire an image and then determine if the image contains the user or is devoid of the user to determine if the user is in control of system 1. A light sensor may be provided whereby the user must keep a thumb or finger over the light sensor to indicate the user is in control of system 1. A gyroscopic sensor may be provided which senses movement in any of the X-axis, Y-axis, or Z-axis and uses this movement information to determine whether the user is in control of system 1. Thus, the concept of sensing whether a user is in control and thereafter enabling or disabling an operation is a feature of the present invention. This may be implemented with an element adapted to be actuated by a user, wherein the actuation enables the operation and the absence of actuation disables the operation. This may also be implemented with a switch variable in an application installed on remote control 4 and logically connected to an element, which determines which state the variable is set to. The switch variable may be set to a first state or a second state, whereby the first state indicates the application of remote control 4 should enable the operation, and whereby the second state indicates the operation should be disabled. The element logically connected to the variable may be one of the aforementioned graphics on a touchscreen, button, camera, light sensor, or gyroscopic sensor, which sets the switch variable based on whether the user is physically interacting with system 1 to indicate the user is in control of system 1.

Wireless module 15 and wireless module 23 are preferably wirelessly coupled via a short range wireless interconnection technology such as BLUETOOTH® technology. The BLUETOOTH® protocol includes a number of features which are advantageous to the present invention over alternative wireless communication systems. For example, BLUETOOTH® requires very little power per transmission signal, typically in the 1 milliwatt range, so fluid jet cutting machine 2 and/or control unit 7 may incorporate a battery to provide overall power to fluid jet cutting machine 2. This greatly improves mobility of fluid jet cutting machine 2. This further increases safety, as an elongated hydraulic hose, pneumatic hose, or power line and the corresponding risk of accidental cutting of said hose or power line may be eliminated from fluid jet cutting machine 2. BLUETOOTH® further provides an inherent security feature in that the low power of the signals limits the distance between fluid jet cutting machine 2 and remote control 4 to about ten meters. This limited range forces a user to actively remain in proximity to fluid jet cutting machine 2 while in use. One of the features of the present invention relates to the constant pinging back and forth between wireless module 15 and wireless module 23 to ensure the modules are in proximity.

When a ping is unreturned, system 1 actuates a subroutine to shut down fluid jet cutting machine 2 to ensure safety. Further, BLUETOOTH® technology does not require a line of sight between fluid jet cutting machine 2 and remote control 4 which is typically required in other wireless technologies such as infrared wireless communication. This allows a user to control fluid jet cutting machine 2 from a vehicle or behind a partition or safety shield. Finally, BLUETOOTH® technology uses spread-spectrum frequency hopping to ensure that no other devices are transmitting on the same frequency at the same time. This provides a critical safety feature to ensure that no other devices can take control of or affect fluid jet cutting machine 2 and/or control unit 7.

Figure 3:
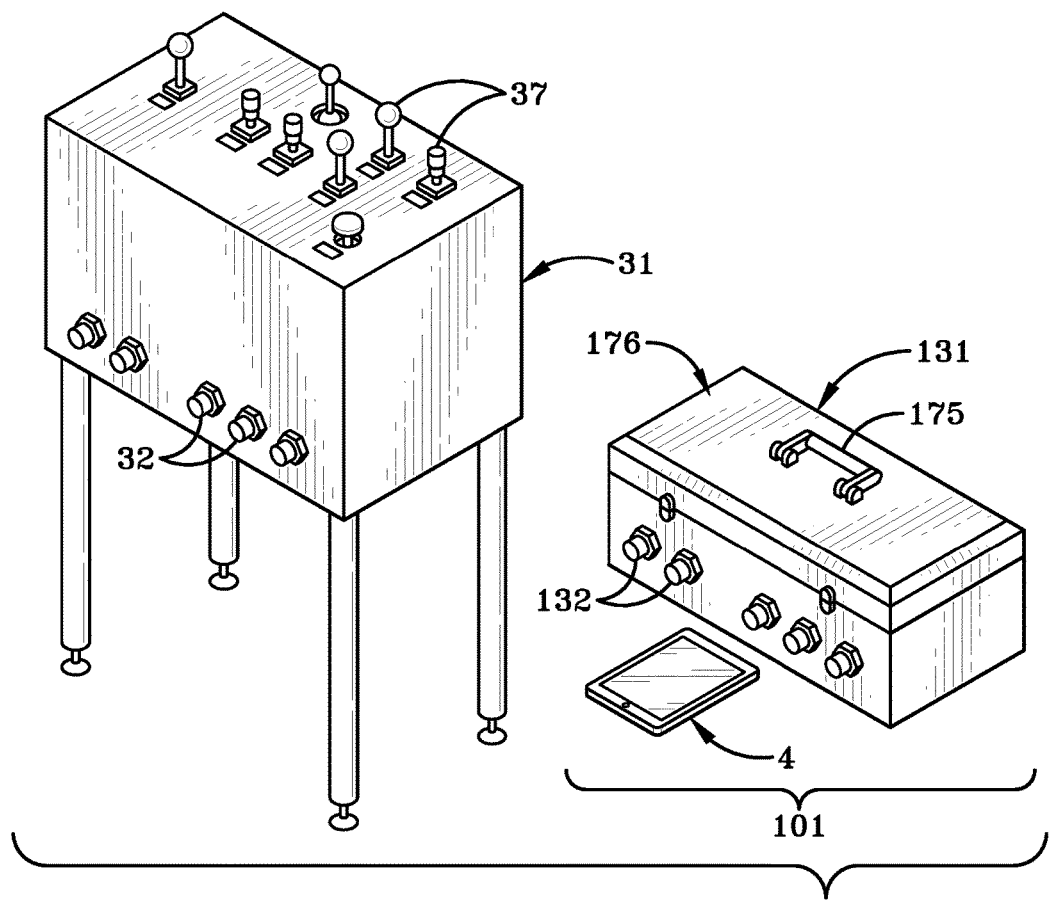
FIG. 3 is a view of a prior art water jet cutting system juxtaposed with a portion of a second embodiment of the present invention.
Figure 5:
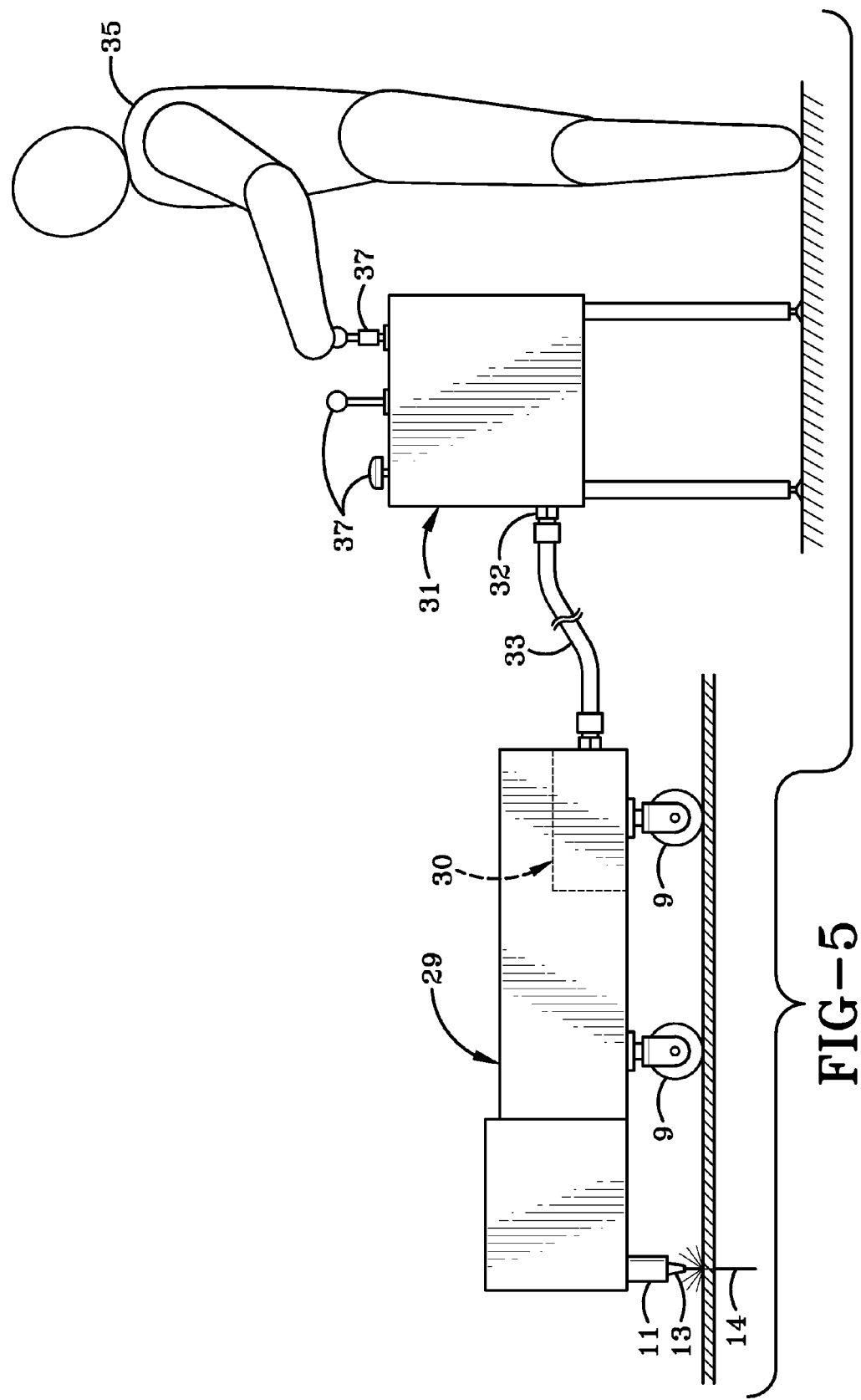
FIG. 5 is a perspective view of a prior art control station next to an operating device in the form of a water jet cutting machine.
Figure 6:
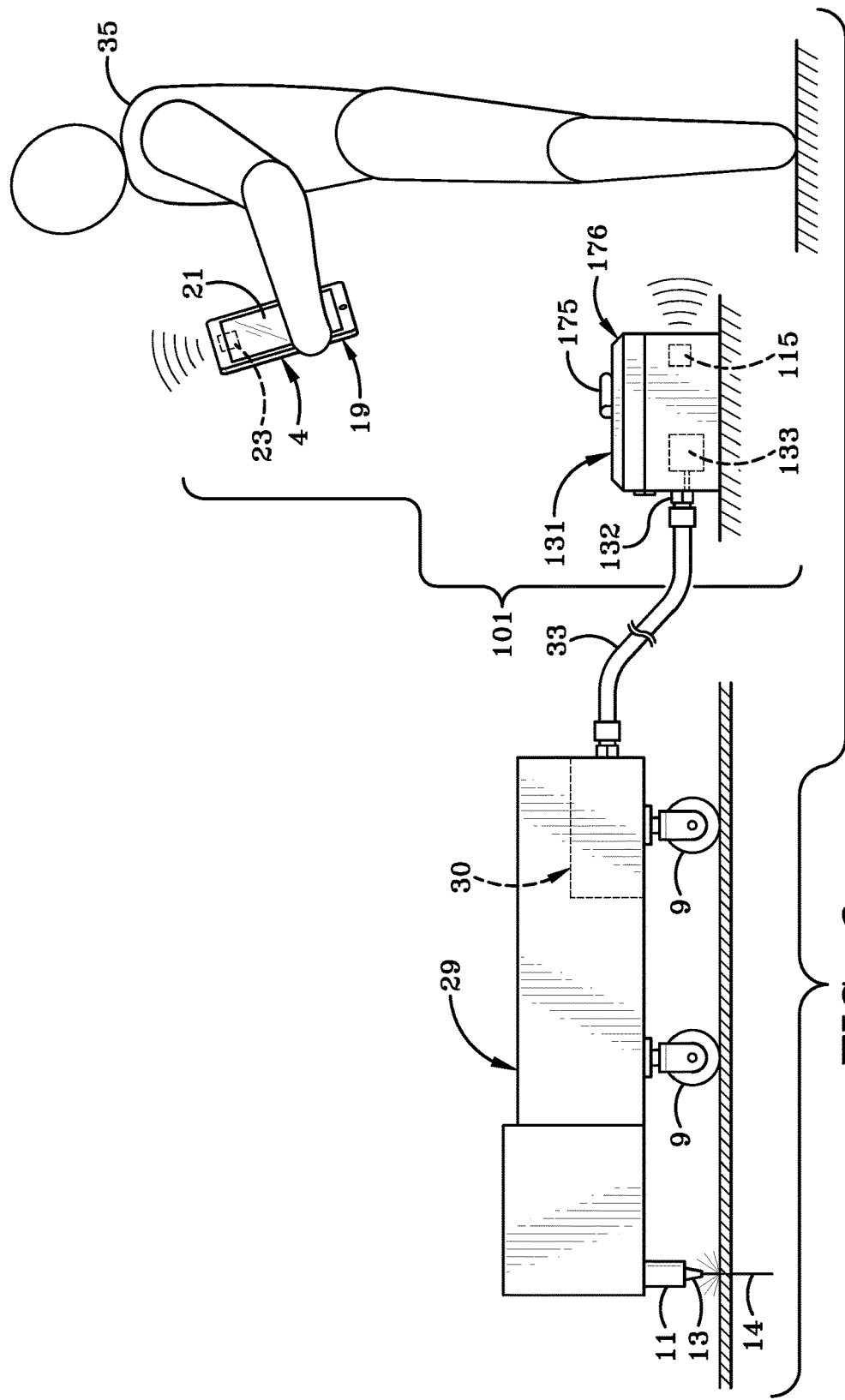
FIG. 6 is a perspective view of the second embodiment of the present invention next to an operating device in the form of a water jet cutting machine.

The wireless control of fluid jet cutting machine 2 by way of remote control 4 may be provided by way of a modularized system which is connectable to other operating devices such as fluid jet equipment and systems, as represented by a generic fluid jet equipment 29 shown in FIGS. 5 and 6. Generic equipment 29 is representative of any fluid jet device which may be movable along a track, movable without a track, a stationary device, any other style of operating device commonly found in any field. As shown in FIG. 3, one familiar with the fluid jet field will recognize that control unit 7 discussed above with respect to fluid jet cutting machine 2 improves elements commonly embodied in the prior art as an on board hardwired control system 30 and a control station 31. Onboard hardwired control system 30 is commonly connected via a group of hydraulic, pneumatic, and/or electric hoses/wires 33 (henceforth known as "lines 33") to a set of sockets or connectors 32 of control station 31. Control station 31 is actuated by a user 35 to send controlling pressure or electric signals via lines 33 to onboard control system 30, which in turn actuates equipment 29. User 35 manually manipulates a series of mechanical controls 37 to actuate equipment 29. As discussed above, this requires user 35 to stand in a fixed position to operate equipment 29. Further, control systems implementing control station 31 such as those shown in FIGS. 3 and 5 do not incorporate any mechanism to sense whether user 35 has become incapacitated or moved away from control station 31.

Figure 4:
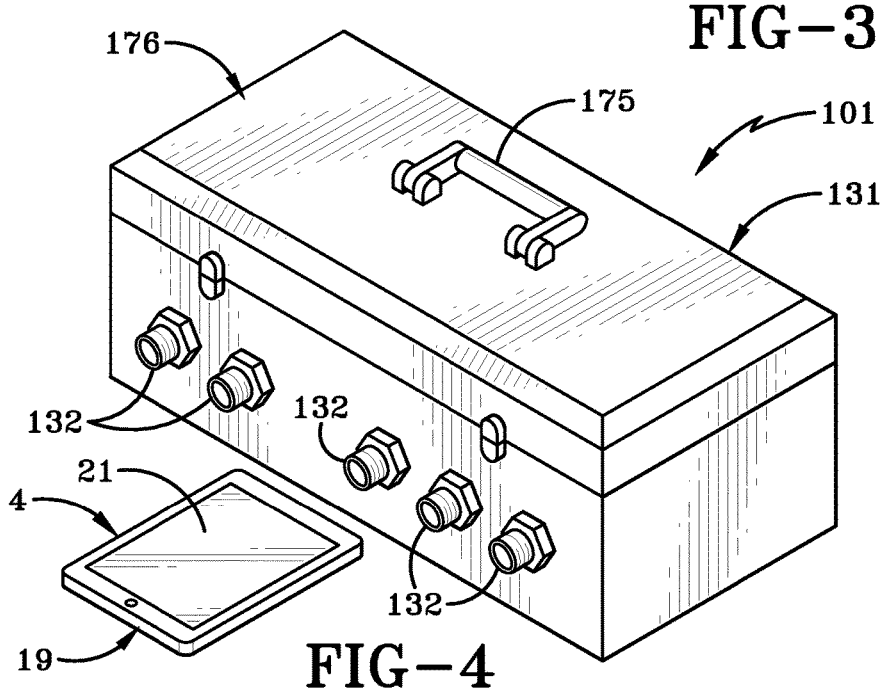
FIG. 4 is a view of a portion of the second embodiment of the present invention, including a computing device and a control unit.

As shown in FIGS. 3, 4 and 6, a second embodiment of the present invention is shown as system 101, which includes a portable control unit 131 in communication with remote control 4. Portable control unit 131 includes a wireless module 115, similar to the previously discussed wireless module 15 of fluid jet system 1. Portable control unit 131 further includes a set of connectors 132, similar to connectors 32 of control station 31. In system 101, control unit 131 is connected to equipment 29 in place of control station 31. An operator or user such as user 35 operating system 101 manually locates control unit 131 in close proximity to equipment 29. User 35 then manually disconnects lines 33 from connectors 32 of control station 31 and reconnects those lines 33 to the appropriate connectors 132 of control unit 131. User 35 then initiates a BLUETOOTH® pairing of control unit 131 with remote control 4 via wireless module 115 of control unit 131 and wireless module 23 of remote control 4. Once control unit 131 is paired and coupled with remote control 4, user 35 simply manipulates interface 21 while holding a finger on safety zone 27 to operate equipment 29. User 35 is free to move about to more easily see the operation of equipment 29 or to move to safer areas as equipment 29 performs its operations.

A system 101 adapted to activate and deactivate an operation of an operating device 29 is disclosed, the system 101 comprising: a control unit 131 having a wireless module 115, wherein the control unit 242 is removably connected to the operating device 29; a valve control body 133 (FIG. 6) disposed in the control unit, wherein the valve control body 133 is operable in an open position and a closed position; a connector 132 having a first end and a second end, wherein the first end is connected to the valve control body 133, and wherein the second end is removably connected to the operating device 29; a computing device 4 having a wireless module 23; a wireless communication link between the wireless module 115 and the wireless module 23; wherein the computing device 4 is operable to move the valve control body 133 between the open position and closed position via the wireless communications link; wherein the operation of the operating device 29 is activated when the valve control body 133 is in one of the open position and the closed position; and wherein the operation of the operating device 29 is deactivated when the valve control body 133 is in the other one of the open position and the closed position.

Inasmuch as the water jet industry enjoys a generally standardized set of connectors for actuating various equipment or machines, control unit 131 can be connected to a number of different pieces of equipment to provide wireless control and a dead man's switch to any user of that equipment. Further, adapters may be provided to interconnect any necessary items or elements and to allow control unit 131 to connect with various equipment and operating devices. Further, control unit 131 is entirely portable and able to be easily transported between jobsites by a single individual with no specialized equipment. This represents an advantage over the prior art which provided large bulky control units such as those indicated as control station 31 in FIGS. 3 and 5. As shown in FIG. 3, one will readily note the size and weight differences between control station 31 and control unit 131. The small size and portability of control unit 131 allows a user to transport wireless control system 101 between physical locations. Further, efficiencies are realized by using one control unit 131 in place of several control stations 31. As shown in FIG. 4, control unit 131 may be provided with a handle 175 extending from a housing 176 used to encapsulate the internal mechanisms of control unit 131. Control unit 131 is further provided with an electrical input such as a power receiving prong or set of prongs (not shown) for receiving a power cord from an electrical source. Further, control unit 131 may be provided with a battery backup system (not shown) for providing batter power to control unit 131 in the event of a power outage or simply to provide better portability to control unit 131.

Control unit 131 is provided with various mechanical components for actuating the various connectors 132 as instructed by the holder of remote control 4. A set of solenoids (not shown) may be used to turn a particular connector on or off. The set of solenoids may be electronically actuated, hydraulically actuated, or pneumatically actuated. Further, it has been discovered that the bleed off pilot pressure from a particular electronically actuated solenoid may be connected with a manual hydraulic or manual pneumatic actuation control to allow a user to manually actuate the electronic solenoid in the event of a power failure. This manual actuation may then be actuated by a user to stop a process when the electric power to the solenoid is not operating and provides a critical safety mechanism for control unit 131. While solenoids may be used for on/off control of connectors 132, a similar set of servomotors (not shown) may be used in conjunction with the set of solenoids to control the rate of flow through the connectors.

Control unit 131 may include one or more sensors for ensuring overall safety in system 1. Control unit 131 may include a gyroscopic sensor (not shown) which actuates system 1 to initiate a subroutine to shut down equipment 29 when it senses any kind of quick movement of control unit 131. The movement may be caused by an accident on the job site, an earthquake, an explosion, a vehicle bumping or disrupting control unit 131 or any other reason for unintentionally imparting quick movement to control unit 131. This safety feature allows for an automatic deadman switch type of shut down of equipment 29. Other sensors may also be employed for similar safety and automatic shutdown of equipment 29. For example, a pressure sensor may be employed for use in shutting down equipment 29 in the event of a drop or rise in pressure beyond a predetermined threshold. Likewise, a gas sensor for detecting flammable gases may be employed in a similar manner. Further, a battery sensor or subroutine may be employed to track the battery life of remote control 4 and to ensure equipment 29 is automatically shutdown before remote control 4 loses power.

While equipment in the field all includes a generally standardized set of connectors, the actual pressures, voltages, hydraulics, etc. used to interact with the equipment needs tailored or customized for each model of equipment, each equipment family, or each operating device. This is addressed by offering plugins, software updates, or even entirely different encapsulated applications for each model of equipment or equipment family which a user may desire to control. As such, interface 21 may be offered in whole or in part as a physical bundle of software, a software download from the Internet, or as a precompiled application downloadable through an application store such as iTunes® or Google Apps Marketplace®, or downloadable through the Internet in general. One will readily understand that this software may be offered for each desired underlying operating system or hardware architecture to allow a user to use an off-the-shelf tablet or mobile device as remote control 4.

For example, if a user purchases or rents a particular piece of equipment 29A and desires to utilize system 101 with equipment 29A, the user downloads and installs software which is tailored to provide an interface 21A on the user's movable device. This enables that device to become remote control 4 and control equipment 29A. If the user has a touch-screen tablet such as an IPAD®, the software download will be compiled and customized to run on the IPAD®. If that user wishes to use a new piece of equipment 29B, system 101 may include the feature that the user may update the software to provide an interface 29B to control equipment 29B. System 101 may alternatively include the feature that the user may download a new piece of software which is tailored to provide interface 29B on the user's movable device. Or the software may be configured such that a user must purchase a new activation code to use interface 21 with a new piece of equipment.

Similar to updating or changing the underlying software, the hardware may be updated or changed as well in system 101. If the user acquires a tablet computer such as a KINDLE FIRE® and wishes to now control equipment 29B on the KINDLE FIRE® the software to provide interface 29B may be downloaded and installed on the KINDLE FIRE®. As such, any method for providing to the user a way to incorporate an off-the-shelf movable device with interface 21 is contemplated by the present invention. The underlying software to provide interface 21 may be a single download, a plugin to previously installed software, or any other method common in the art for providing and updating software.

The application used with remote control 4 to control the operating device may be configured or programmed to utilize one or more particular hardware features of the computing device, such as a touchscreen, button, camera, light sensor, or gyroscopic sensor. These pieces of computing hardware may be logically connected to internal variables residing in the application and may be configured to control the enabling and disabling of an operation on the operating device.

Interface 21 and the software involved with providing interface 21 may keep a detailed record of events and status information produced while interface 21 is used. Further, system 101 may provide a data collection subroutine running in the background to export all data or any relevant data to a file or database for later analytics or review. System 101 may even store commonly used routines or manipulations of interface 21 for repeatability of common operations. Costing and timing information may be obtained and stored by the software. Interface 21 may be integrated with accounting or purchasing software, or automatically update a database such as an enterprise level inventory database, etc. Usage and depreciation of particular system components such as a blade or a nozzle may be automatically calculated and linked with a purchasing system. All of these features are contemplated and within the scope of system 101.

While the above system 101 is discussed with respect to the water jet cutting field, it will be readily apparent that control unit 131 may be reconfigured and customized to apply to any field of commercial or industrial activities. It follows that interface 21 may also be customized to apply to the alternative field of commercial or industrial activities. Thus, it is within the scope of the present invention that a wireless control system similar to those discussed above may be connected or coupled to any device where the user is required to be tethered to or in a fixed position for operating the device or where a deadman switch would be beneficial.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A method comprising the steps of:
providing a portable fluid jet machine for performing an operation using pressurized fluid sprayed through a nozzle, wherein the fluid jet machine comprises a working unit and a pump unit; and wherein the pump unit includes mechanisms for pumping high pressure water to a nozzle operatively engaged with the working unit;
providing a portable stand-alone control unit, where the control unit includes a housing;
providing one or more connectors on the housing;
providing a plurality of control valves in the control unit;
connecting the plurality of control valves in the control unit to the pump unit of the portable fluid jet machine with the one or more connectors;
providing a hand-held mobile computing device to a human operator located on the ground and within sight of the fluid jet machine;
wirelessly connecting the mobile computing device to the control unit;

sending one or more wireless signals from the computing device to the control unit;

actuating the plurality of control valves in the control unit upon receipt of the one or more wireless signals;

assuming control of the pump unit on the fluid jet machine with the control unit;

manipulating a user interface on the computing device using the human operator's hand to control the control unit;

using the computing device to operate the fluid jet machine via the one or more connectors and the plurality of control valves of the control unit;

selectively actuating the pump unit on the fluid jet machine using one or more of the plurality of valves on the control unit;

pumping water under pressure from the pump unit to the working unit and thereby to the nozzle that is operatively engaged with the working unit; and performing the operation of the fluid jet machine.

2. The method of claim 1, wherein the step of using wireless signals further comprising the steps of:

sending a first signal from the computing device held by the human operator to the control unit;

translating the first signal into a second signal;

sending the second signal from the control unit to the fluid jet machine via the connector; and actuating an operation of the fluid jet machine when the fluid jet machine receives the second signal.

3. The method of claim 1, further comprising the steps of:

providing a plurality of selectable options on the user interface of the computing device, wherein each option corresponds to an operation of the jet machine;

selecting, by contacting the user interface with the human operator's finger, an option corresponding to a desired operation of the fluid jet machine;

encapsulating information about the selected option into a first signal;

sending the first signal from the computing device to the control unit;

translating the first signal into a second signal;

sending the second signal from the control unit to the fluid jet machine via the connector; and actuating the desired operation of the fluid jet machine when the fluid jet machine receives the second signal.

4. The method of claim 3, further comprising the steps of:

correlating the second signal with a particular combination of the plurality of control valves; and actuating each control valve in the particular combination to send the second signal from the control unit to the fluid jet machine.

5. The method of claim 4, further comprising the step of generating a pressure through each control valve in the particular combination to send the signal from the control unit to the fluid jet machine.

6. The method of claim 5, further comprising the steps of:

disconnecting the control unit from the fluid jet machine;

moving the control unit to a different physical location;

connecting the control unit to a second fluid jet machine; and using the computing device to operate the second fluid jet machine via the control unit.

7. The method of claim 5, further comprising the steps of:

disconnecting the computing device from the control unit;

connecting a second computing device to the control unit wirelessly; and using the second computing device to operate the fluid jet machine in real time using the human operator via the control unit.

8. The method of claim 1, further comprising a step of positioning the control unit at any close distance to the fluid jet machine.

9. The method of claim 8, wherein the step of positioning the control unit includes:

providing a handle on the control unit;

lifting the control unit by the handle; and moving the control unit from a first location remote from the fluid jet machine to a second position where the control unit is at any close distance to the fluid jet machine.

10. The method of claim 1, further comprising the steps of:

sending a second signal from the fluid jet machine to the computing device; and updating a display on the computing device upon receiving the second signal.

11. The method of claim 1, wherein the fluid jet machine includes wheels and the method further comprises:

actuating the fluid jet machine upon receipt of the one or more wireless signals; and wherein the step of actuating the fluid jet machine further comprises actuating the wheels and physically moving the machine over a surface.

12. The method of claim 1, wherein the step of connecting the control unit to the fluid jet machine via the connector includes forming a wired communication link between the control unit and the fluid jet machine.

13. The method of claim 1, wherein the performance of the operation of the fluid jet machine does not utilize any controls of the fluid jet machine.

14. A system adapted to activate and deactivate an operation of a portable fluid jet machine, the system comprising:

a portable fluid jet machine including a pump unit;

a hand-held mobile computing device having a first wireless module;

a portable stand-alone control unit having:

a housing;

a second wireless module located within the housing;

a valve control body disposed inside the housing of the control unit, wherein the valve control body is selectively operable in an open position and a closed position;

a connector provided on the housing; said connector having a first end and a second end, wherein the first end is connected to the valve control body, and wherein the second end is removably connected to the pump unit of the fluid jet machine;

a wireless communication link between the first wireless module and the second wireless module;

wherein the computing device is operable by a human operator in the immediate vicinity of the fluid jet machine to control and move the valve control body in real time between the open position and closed position via the wireless communications link and to thereby control the pump unit of the fluid jet machine;

wherein the operation of the pump unit of the fluid jet machine is activated when the valve control body is in one of the open position and the closed position; and wherein the operation of the pump unit of the fluid jet machine is deactivated when the valve control body is in the other one of the open position and the closed position.

15. The system of claim 14, further comprising:
a first signal, wherein the first signal is sent from the first wireless module to the second wireless module via the communication link, and wherein the valve control body moves to the open position when the second wireless module receives the first signal; and
a second signal sent from the first wireless module to the second wireless module via the communication link, and wherein the valve control body moves to the closed position when the second wireless module receives the second signal.

16. The system of claim 15, further comprising a user interface of the computing device, wherein the first signal and the second signal is generated by physically contacting and manually manipulating the user interface using the human operator's hand.

17. The system of claim 16, wherein the interface is a touchscreen.

18. The system of claim 17, further comprising:
a fluid disposed in valve control body and the connector;
wherein the operation is activated via the fluid when the valve control body is in one of the open position and the closed position; and
wherein the operation is deactivated via the fluid when the valve control body is in the other of the open position and the closed position.

19. The system of claim 14, further comprising a line extending between the connector provided on the control unit and the fluid jet machine.

20. The system of claim 14, further comprising:
a display on the computing device;
a set of system metrics, wherein the set of system metrics is communicated from the fluid jet machine to the computing device by way of a wireless communications link; and
an output presented on the display, wherein the output graphically represents the set of system metrics.

21. A method comprising:
holding a mobile computing device in a human operator's hand;
wirelessly connecting the computing device to a portable stand-alone control unit to form a wireless communication link therebetween by manipulating a user interface on the computing device using the human operator's hand;
connecting a valve provided inside the portable control unit to a pump unit provided in a portable fluid jet machine that is located in the immediate vicinity of the human operator by way of a connector provided on the control unit;
manipulating the user interface on the computing device using the human operator's hand to enable a control signal between the control unit and the fluid jet machine via the connector;
activating, through one of opening or closing of the valve, an operation of the pump unit of the fluid jet machine;
manipulating the user interface on the computing device using the human operator's hand to control the operation of the pump unit of the fluid jet machine through the control unit;
manipulating the user interface on the computing device using the human operator's hand to disable the control signal between the control unit and the fluid jet machine via the connector by the other of the opening or the closing of the valve to deactivate the operation of the one of the pump unit of the fluid jet machine;
wherein the enabling step is actuated by wirelessly transmitting a first signal from the computing device to the portable control unit; and
wherein the disabling step is actuated by wirelessly transmitting a second signal from the computing device to the portable control unit.

22. The method of claim 21, further comprising the steps of:
manipulating the user interface on the computing device using the human operator's hand to open the valve provided inside the control unit to enable the control signal between the connector on the control unit and the fluid jet machine; and
manipulating the user interface on the computing device using the human operator's hand to close the valve to disable the control signal between the connector on the control unit and the fluid jet machine.

23. The method of claim 22, further comprising the steps of:
displaying a graphic on the user interface on the computing device;
manipulating the graphic on the user interface to open the valve in the control unit; and
manipulating the graphic on the user interface to close the valve in the control unit.

24. The method of claim 23, wherein the wireless transmitting further comprising the steps of:
sending a first signal from a first wireless module in the computing device to a second wireless module in the control unit via the wireless communication link;
opening the valve in the control unit upon receiving the first signal;
sending a second signal from the first wireless module in the computing device to the second wireless module in the control unit via the wireless communication link; and
closing the valve in the control unit upon receiving the second signal.

25. The method of claim 24, wherein the control signal is embodied in an amount of liquid pressure in a hydraulic system of the fluid jet machine.

26. The method of claim 24, wherein the control signal is embodied in an amount of air pressure in a pneumatic system of the fluid jet machine.

* * * * *